July 22, 1952   C. G. BACON ET AL   2,604,512
CONCENTRIC TESTER
Filed Dec. 6, 1950

Inventors:
Conrad G. Bacon,
Paul C. Gardiner,
by Paul A. Frank
Their Attorney.

Patented July 22, 1952

2,604,512

UNITED STATES PATENT OFFICE 2,604,512

CONCENTRIC TESTER

Conrad G. Bacon, Philadelphia, Pa., and Paul C. Gardiner, Scotia, N. Y., assignors to General Electric Company, a corporation of New York Application December 6, 1950, Serial No. 199,485

2 Claims. (Cl. 175—183)

Our invention relates to concentricity testers and more particularly to devices for checking the concentricity of a conductor with respect to the insulation therearound.

Electric insulation is often applied to wire by an extrusion type process. Machines have been developed to insulate wire by such an extrusion process as the wire is drawn through the machine. At the point in such a machine where the extruding process is completed and the insulated wire emerges, the machine is provided with adjustable jaws for regulating the size and shape of the insulated cable. In such an insulating process the conductor in the insulated cable leaving the machine is not always concentric with respect to the insulation. Departures from the concentric position substantially reduce the insulation resistance of the cable at the point of departure.

At the present time the thickness of the insulation applied to a wire in an extruding process is made substantially greater than is necessary in order that minor departures from the concentric position will not violate any predetermined specifications for the cable. This type of protection is extremely expensive and is by no means foolproof. In fact, the cable must be cut periodically to check the concentricity of the conductor with respect to the insulation.

Therefore, an important object of our invention is to provide means for detecting lack of concentricity in a cable being delivered from an insulating machine.

Another object of our invention is to provide means for indicating to an observer or to a correcting control device the extent of any eccentricity of a conductor with respect to the insulation therearound, as soon as such an eccentric condition occurs.

In carrying out our invention in one embodiment thereof, a high frequency voltage is applied to an insulated cable through electrodes in contact with the cable. The changes in capacity between the conductor in the cable and the electrodes in contact with the circumference of the cable insulation are used to change the voltages across the output terminals of capacitive voltage dividers. The changes in the output voltages of the voltage dividers are amplified and applied to electric meters which indicate the position of the conductor within the insulation.

Figure 1:
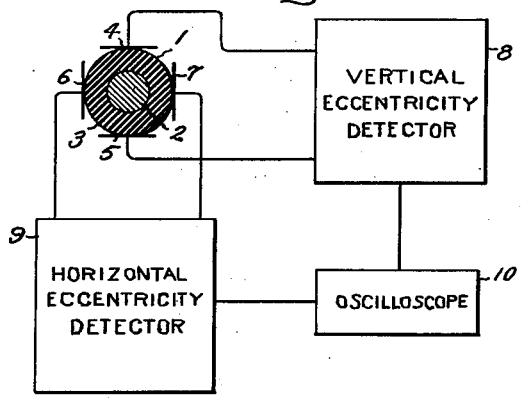
Figure 2:
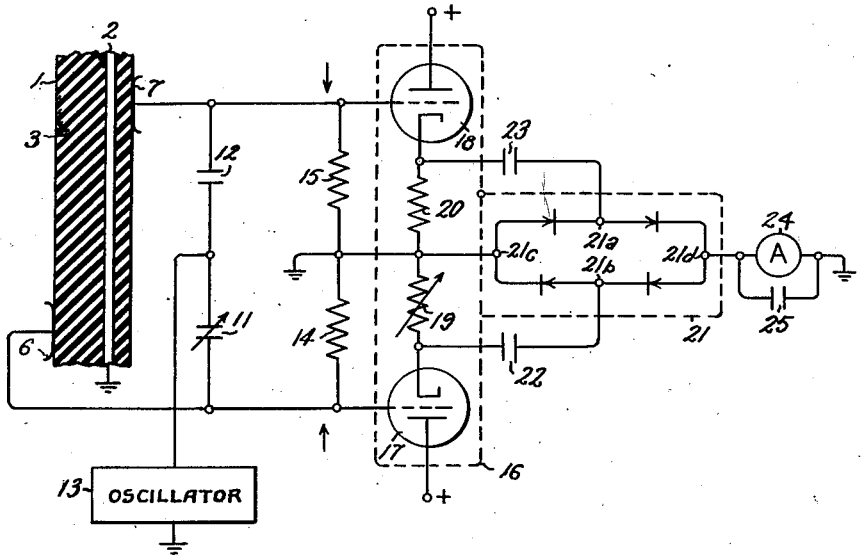
Figure 3:
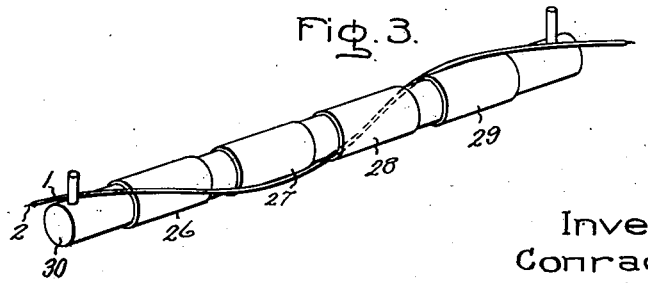

The features of our invention which we believe to be novel are set forth with particularity in the appended claims. Our invention itself, however, both as to its organization and method of operation together with further objects and advantages thereof, may best be understood by reference to the following description taken in connection with the accompanying drawing, in which Fig. 1 is a conventional box and line diagram of a concentricity tester embodying our invention; Fig. 2 is a schematic circuit diagram of our invention; and Fig. 3 is a modification of the electrode arrangement used in our invention.

Referring to the drawings, a cable 1 has a conductor 2 disposed within the insulation 3. Conductor 2 is to be checked for concentricity with respect to insulation 3. Conductor 2 is connected to ground through the insulating machine used to apply insulation 3 to conductor 2. A plurality of electrodes, such as the electrodes 4, 5, 6 and 7, are in contact with insulation 3 and are preferably spaced at 90 deg. intervals around the circumference thereof. Each of the aforesaid electrodes effectively forms a variable capacitor with conductor 2. As the position of conductor 2 changes with respect to insulation 3, the capacitance between conductor 2 and the electrodes also changes.

Electrodes 4 and 5 are connected to an electric circuit which we have called a vertical eccentricity detector 8. Electrodes 6 and 7 are connected to a horizontal eccentricity detector 9. Detectors 8 and 9 supply to an indicating device such as the oscilloscope 10 a signal which is proportional to the displacement of conductor 2 from a concentric position. The output of detector 8 is connected to the vertical deflection plates of oscilloscope 10, and the output of detector 9 is connected to the horizontal deflection plates of oscilloscope 10.

Since the vertical and horizontal detecting circuits are identical, only the horizontal detector circuit 9 is shown in detail. Horizontal detector circuit 9 is shown in detail in Fig. 2 in conjunction with a segment of cable 1 in which conductor 2 is displaced from the concentric position. In Fig. 2 oscilloscope 10 has been replaced by the rectifying circuit 21 and the meter 24.

The capacitor 11 is serially connected with the capacitance formed by conductor 2 and electrode 6. The capacitor 12 is serially connected with the capacitance formed by conductor 2 and electrode 7. Each of the aforementioned series circuits serves as a voltage divider in detector circuit 9 and has one terminal thereof connected to ground. An oscillator 13 generating a high frequency, such as 9.5 kilocycles, is connected across the input terminals of both of the aforesaid voltage dividers. The output of each of the voltage dividers is taken between ground and the respective electrode. Therefore, whenever the position of conductor 2 changes in a horizontal plane within insulation 3, the voltage across the output terminals of one of the aforesaid voltage dividers decreases while the voltage across the output terminals of the other voltage divider increases. Stated otherwise, a first pair of capacitors comprising the conductor 2 and the electrodes 6 and 7 respectively is arranged in a bridge circuit with a second pair of capacitors 11 and 12. Conductor 2, being grounded, is one input terminal and in reality constitutes a junction point between the first pair of capacitors comprising conductor 2 and electrodes 6 and 7. The conductor connected between capacitors 11 and 12 to which the oscillator 13 is connected constitutes a junction point for the capacitors of the second pair of capacitors and is another input terminal for the bridge circuit. The connection between electrode 7 and capacitor 12 and the connection between electrode 6 and capacitor 11 constitute a pair of output terminals for the bridge circuit.

The resistors 14 and 15 connected from ground to electrodes 6 and 7 respectively simply serve as grid leak resistors. Resistors 14 and 15 are of a relatively high magnitude, such as 20 megohms each. In order that an appreciable signal may be derived from the voltage dividers without requiring an extraordinary load of oscillator 13, an impedance transforming device such as the balanced amplifier circuit 16 is employed. Amplifiers 17 and 18 are connected in circuit 16 as cathode followers. Load resistors 19 and 20 are connected between ground and the cathodes of amplifiers 17 and 18 respectively and are of a magnitude such as 5000 ohms each. Electrodes 6 and 7 are connected to the control electrodes of amplifiers 17 and 18 respectively.

A rectifier, such as the bridge type rectifier circuit 21, having input terminals 21a and 21b and having output terminals 21c and 21d is connected across the output terminals of balanced amplifier circuit 16. Condensers 22 and 23 are blocking condensers to prevent the direct current component of current flowing in balanced amplifier circuit 16 from flowing into bridge rectifier 21. An indicating device such as the microammeter 24 is connected across the output terminals of bridge rectifier 21. Capacitor 25 bypasses the alternating component of the pulsating direct current flowing from bridge rectifier 21 around meter 24. Meter 24 is preferably a direct current microammeter having the zero deflection point at mid-scale. Terminal 21c is connected to ground.

Capacitors 22 and 23 each draw current through one side of bridge rectifier 21 and drive current through the other side as they are charged or discharged in response to instantaneous changes in the voltage thereacross. To set up the eccentric indicator circuit for operation, a section of cable 1 having conductor 2 concentric with respect to insulator 3 must be located between electrodes 6 and 7. At this time the alternating voltages on terminals 21a and 21b should be equal. The average current in meter 24 is then zero since each of the voltages causes meter 24 to deflect in a different direction. If meter 24 does not indicate zero current, condenser 11 may be varied to compensate for differences in lead lengths and resistor 19 may be varied to compensate for differences in the characteristics of amplifiers 17 and 18. These adjustments balance the amplifier circuit 16 and cause meter 24 to show zero deflection.

When conductor 2 is displaced from the concentric position, as shown in Fig. 2, the capacity between conductor 2 and electrode 7 is decreased and the capacity between conductor 2 and electrode 6 is increased. This results in an increase in the potential of the control electrode of amplifier 18 with respect to ground and a decrease in the potential of the control electrode of amplifier 17 with respect to ground. This causes amplifier 18 to draw considerably more current than amplifier 17 with the result that terminal 21a is raised to a higher potential with respect to ground than terminal 21b. Current now passes through meter 24 from terminal 21d to ground on the positive half cycle of oscillator voltage. The deflection on meter 24 is to the right of mid scale, thus indicating to an observer that conductor 2 has moved to the right. The observer can then adjust the jaws on the insulating machine to bring conductor 2 back into a concentric position. When conductor 2 returns to the concentric position, the potentials appearing on the control electrodes of amplifiers 17 and 18 become equal and the resulting indication on meter 24 is zero.

If conductor 2 moves to the left, the reaction of detector circuit 9 is similar to that hereinbefore described except that amplifier 17 now draws considerably more current than amplifier 18 and current is drawn through meter 24 from ground to terminal 21d on the negative half-cycle of the oscillator voltage. The deflection on meter 24 is to the left, thus indicating to an observer that conductor 2 has moved to the left.

Vertical detector 8 operates in a manner similar to that hereinbefore described for detector 9 to indicate vertical displacement of conductor 2. When meters are used as indicators, as in Fig. 2, the operator observes vertical and horizontal displacement of conductor 2 on separate meters. If an oscilloscope is used, as in Fig. 1, both displacements can be observed on the same screen at the same time.

It has been found that the electrodes shown in Figs. 1 and 2 are satisfactory for cables having a diameter of ¼" or greater. However, with smaller cables the difficulties in constructing electrodes for satisfactory contact with the insulation become substantial. With the smaller diameter wires an arrangement such as that shown in Fig. 3 has been found to be convenient. In this case, the electrodes are cylindrical in shape, such as the electrodes 26, 27, 28 and 29, and the cable passes around the electrodes. These electrodes are mounted on a support such as a Bakelite rod 30. Cable 1 is then passed around rod 30 as shown in Fig. 3 so that electrodes 26 and 28 become the electrodes for detecting horizontal deflection, and the electrodes 27 and 29 become the electrodes for detecting vertical deflection. This accomplishes engagement of the cable with each electrode for approximately 90 degrees of the cable circumference. Thus each electrode sees an incremental length of the cable insulation involving 90 degrees circumferentially.

While the present invention has been described by reference to the particular embodiments thereof, it will be understood that this is by way of illustration of the principles involved and that those skilled in the art may make modifications in the arrangement and mode of operation. Therefore, we contemplate by the appended claims to cover any such modifications as fall within the true spirit and scope of our invention.

What we claim as new and desire to secure by Letters Patent of the United States is:

1. For use in conjunction with an insulated conductor, a device for checking concentricity of said conductor with respect to the insulation therearound and comprising a shaft, cylindrical electrodes mounted on said shaft and spaced longitudinally along said shaft, said electrodes being concentric with respect to said shaft, said insulated conductor being wrapped around said shaft so that said insulation contacts each of said electrodes substantially in an area 90 degrees displaced from the contact area on adjacent electrodes, a different eccentric indicating circuit connected to each pair of said electrodes having diametrically opposite contact areas, each of said indicating circuits comprising a bridge-type rectifying device having output and input terminals, indicating means responsive to current therethrough and connected across said output terminals, one of said output terminals being connected to ground, a balanced amplifier circuit connected to said input terminals, said conductor being connected to ground, a plurality of capacitors each having one terminal connected to a different one of said electrodes, means for producing electric oscillations, one terminal of said oscillator means connected to the other terminal of each of said last-mentioned capacitors, the other terminal of said oscillator means connected to ground, and electric circuit means connecting said electrodes to said balanced amplifier circuit.

2. For use in conjunction with an insulated conductor, a device for checking concentricity of said conductor with respect to the insulation therearound and comprising a shaft, cylindrical electrodes mounted on said shaft and spaced longitudinally therealong, said electrodes being concentric with respect to said shaft, said insulated conductor being wrapped around said shaft so that said insulation contacts a pair of said electrodes, the contact areas of said pair of said electrodes being 180 degrees displaced from each other, said pair of said electrodes and said conductor constituting a first pair of capacitors, a second pair of capacitors, circuit means connecting said first and second pairs of capacitors in a bridge circuit having input terminals at the junction points between the capacitors of each pair and having output terminals at the connections between the capacitors of one pair and the capacitors of the other pair, means for supplying alternating current to said input terminals, and means responsive to an unbalance of voltage across said output terminals for performing a control or indicating operation.

CONRAD G. BACON.
PAUL C. GARDINER.

REFERENCES CITED

The following references are of record in the file of this patent:

UNITED STATES PATENTS

| Number | Name | Date |
| --- | --- | --- |
| 2,177,528 | Kidd | Oct. 24, 1939 |
| 2,274,735 | Peters et al. | Mar. 3, 1942 |